US007486002B2

(12) United States Patent
Pulskamp

(10) Patent No.: US 7,486,002 B2
(45) Date of Patent: Feb. 3, 2009

(54) LATERAL PIEZOELECTRIC DRIVEN HIGHLY TUNABLE MICRO-ELECTROMECHANICAL SYSTEM (MEMS) INDUCTOR

(75) Inventor: Jeffrey S. Pulskamp, Leesburg, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 11/936,959

(22) Filed: Nov. 8, 2007

(65) Prior Publication Data

US 2008/0061916 A1 Mar. 13, 2008

Related U.S. Application Data

(63) Continuation-in-part of application No. 11/387,078, filed on Mar. 20, 2006, now Pat. No. 7,420,318.

(51) Int. Cl.
*H02N 2/14* (2006.01)

(52) U.S. Cl. ............................ 310/316.01; 310/316.02

(58) Field of Classification Search ............ 310/316.01, 310/316.02

See application file for complete search history.

(56) References Cited

U.S. PATENT DOCUMENTS

| | | | | | |
|---|---|---|---|---|---|
| 5,914,507 | A * | 6/1999 | Polla et al. | 257/254 |
| 6,037,649 | A * | 3/2000 | Liou | 257/531 |
| 6,184,755 | B1 * | 2/2001 | Barber et al. | 331/181 |
| 6,573,822 | B2 * | 6/2003 | Ma et al. | 336/223 |
| 6,614,093 | B2 * | 9/2003 | Ott et al. | 257/531 |
| 6,621,139 | B2 * | 9/2003 | Yen et al. | 257/531 |
| 6,646,533 | B2 * | 11/2003 | Biegelson et al. | 336/192 |
| 6,656,813 | B2 * | 12/2003 | Ahn et al. | 438/381 |
| 6,683,522 | B2 * | 1/2004 | Walsh | 336/175 |
| 6,995,499 | B2 * | 2/2006 | Hwang | 310/328 |
| 2003/0184426 | A1 * | 10/2003 | Song | 336/200 |
| 2006/0055287 | A1 * | 3/2006 | Kawakubo et al. | 310/348 |

* cited by examiner

*Primary Examiner*—Thomas M Dougherty
*Assistant Examiner*—Bryan P Gordon
(74) *Attorney, Agent, or Firm*—A. David Spevak

(57) ABSTRACT

A MEMS device comprising a substrate; an anchored end connected to the substrate; and an actuator comprising a first electrode; a piezoelectric layer over the first electrode; and multiple sets of second electrodes over the piezoelectric layer, wherein each of the sets of second electrodes being defined by a transverse gap there between, and wherein one of the sets of second electrodes are actuated asymmetrically with respect to a first plane resulting in a piezoelectrically induced bending moment arm in a lateral direction that lies in a second plane. The device further comprises an end effector opposite to the anchored end and connected to the actuator; a ferromagnetic core support structure connected to the end effector; a movable ferromagnetic inductor core on top of the ferromagnetic core support structure; and a MEMS inductor coiled around the ferromagnetic core support structure and the movable ferromagnetic inductor core.

20 Claims, 5 Drawing Sheets

LATERAL PIEZOELECTRIC DRIVEN HIGHLY TUNABLE MICRO-ELECTROMECHANICAL SYSTEM (MEMS) INDUCTOR

CROSS-REFERENCE TO RELATED APPLICATIONS

This application is a Continuation-In-Part (CIP) of U.S. patent application Ser. No. 11/387,078 filed on Mar. 20, 2006, the complete disclosure of which, in its entirety, is herein incorporated by reference.

GOVERNMENT INTEREST

The embodiments described herein may be manufactured, used, and/or licensed by or for the United States Government.

BACKGROUND

1. Technical Field

The embodiments herein generally relate to microelectronic systems, and more particularly to microelectromechanical systems (MEMS) and MEMS inductor technology.

2. Description of the Related Art

MEMS devices are micro-dimensioned machines manufactured by typical integrated circuit (IC) fabrication techniques. The relatively small size of MEMS devices allows for the production of high speed, low power, and high reliability mechanisms. The fabrication techniques also allow for low cost mass production. MEMS devices typically include both electrical and mechanical components, but may also contain optical, chemical, and biomedical elements. Typically, an inductor is configured as a coil comprising conducting material. For example, copper wire may be wrapped around a ferromagnetic core. Such a core typically has a sufficiently high permeability to confine the magnetic field closely to the inductor, which increases the inductance of the device.

Miniaturization of radio frequency (RF) circuits has generally been limited to a degree by the lack of high performance on-chip inductors. The miniaturization thus far of RF circuits has been exploited by the cellular phone and wireless products markets. Military radios and radar systems also benefit from the further miniaturization of RF circuits. Inductors are found in RF matching networks and voltage controlled oscillators; critical components of RF front ends for transceivers and receivers. In some applications, the inductor may need to be tunable; i.e., the inductance of the inductor capable of being selectively modified.

Tunable RF MEMS inductors are an enabling technology for reconfigurable RF circuits. Reconfigurable RF circuits have received a great deal of attention in recent years and would, for example, enable filter bandwidths to be significantly manipulated as system requirements dictate. In addition, inductors in series or in parallel with filter elements also increase filter bandwidth. At present, integrated inductors, in silicon technologies, have produced inductor Q values of less than five. Moreover, MEMS inductors have shown inductor Q values an order of magnitude greater than this. While the industry has its choice of several designs of inductors to select when utilizing them for incorporation into an electromagnetic device, there remains a need for a novel piezoelectric MEMS inductor device which is capable of being tunable, and which can be incorporated in different types of electrical circuits.

SUMMARY

In view of the foregoing, an embodiment herein provides a MEMS device comprising a substrate; an anchored end connected to the substrate; and an actuator comprising a first electrode; a piezoelectric layer over the first electrode; and multiple sets of second electrodes over the piezoelectric layer, wherein each of the sets of second electrodes being defined by a transverse gap there between, and wherein one of the sets of second electrodes are actuated asymmetrically with respect to a first plane resulting in a piezoelectrically induced bending moment arm in a lateral direction that lies in a second plane. The device further comprises an end effector opposite to the anchored end and connected to the actuator; a ferromagnetic core support structure connected to the end effector; a movable ferromagnetic inductor core on top of the ferromagnetic core support structure; and a MEMS inductor coiled around the ferromagnetic core support structure and the movable ferromagnetic inductor core.

Preferably, the ferromagnetic core support structure comprises a base portion connected to the end effector; and a plurality of finger-like projections extending from the base portion. Moreover, the movable ferromagnetic inductor core is preferably on top of the plurality of finger-like projections of the ferromagnetic core support structure. The device may further comprise multiple actuation beams and multiple connection beams adapted to connect the multiple actuation beams to one another. Furthermore, each of the multiple actuation beams preferably comprise two sets of the second electrodes. Additionally, the set of second electrodes may comprise an extensional electrode and a contraction electrode. Also, the device may further comprise a spring attached to the end effector, wherein the spring comprises a residual stress deformation mitigation spring adapted to prevent out-of-plane stress deformation of the actuator. Furthermore, the device may comprise a spring attached to the end effector, wherein the spring comprises a residual stress deformation mitigation spring adapted to restrict translational motion of the end effector to be within the second plane, and wherein the first plane is transverse to the second plane.

Another embodiment provides a MEMS device comprising at least one actuation beam comprising a continuous lower electrode; a piezoelectric layer over the lower electrode; and at least one pair of upper electrodes over the piezoelectric layer. The device further comprises an anchored end connected to the at least one actuation beam; an end effector opposite to the anchored end and connected to the at least one actuation beam; a spring connected to the end effector; a ferromagnetic core support structure connected to the end effector; a movable ferromagnetic inductor core on top of the ferromagnetic core support structure; and a MEMS inductor coiled around the ferromagnetic core support structure and the movable ferromagnetic inductor core.

Preferably, the ferromagnetic core support structure comprises a base portion connected to the end effector; and a plurality of finger-like projections extending from the base portion. Also, the movable ferromagnetic inductor core is preferably on top of the plurality of finger-like projections of the ferromagnetic core support structure. Moreover, the device may further comprise connection beams adapted to connect multiple actuation beams to one another. Additionally, the at least one actuation beam may comprise multiple pairs of the upper electrodes. Moreover, the pair of upper electrodes may comprise a first electrode and a second electrode, wherein the pair of upper electrodes comprising a gap between the first electrode and the second electrode. Preferably, the pair of upper electrodes comprises an extensional electrode and a contraction electrode. Furthermore, the spring member may comprise a residual stress deformation mitigation spring adapted to prevent out-of-plane stress deformation of the actuation beam. Also, one of the multiple pairs of upper electrodes may be actuated asymmetrically with respect to a first plane resulting in a piezoelectrically induced bending moment arm in a lateral direction that lies in a second plane. Moreover, the spring member may comprise a residual stress deformation mitigation spring adapted to restrict translational motion of the end effector to be within the second plane, wherein the first plane is transverse to the second plane. Additionally, the device may further comprise a silicon substrate attached to the anchored end.

Another embodiment provides a MEMS device having a first end and a second end, wherein the device comprises a sensor comprising a piezoelectric layer; and multiple electrodes sandwiching the piezoelectric layer, the multiple electrodes comprising a continuous first electrode attached to a first side of the piezoelectric layer and at least one pair of second electrodes attached to a second side of the piezoelectric layer, wherein the pair of second electrodes comprises a primary electrode and a secondary electrode defined by a transverse gap there between. The device further comprises a substrate anchored to the first end; an end effector attached to the second end; a spring member attached to the end effector, an anchored end connected to the sensor; an end effector opposite to the anchored end and connected to the sensor; a ferromagnetic core support structure connected to the end effector; a movable ferromagnetic inductor core on top of the ferromagnetic core support structure; and a MEMS inductor coiled around the ferromagnetic core support structure and the movable ferromagnetic inductor core, wherein the multiple electrodes are adapted to receive voltage, the voltage causing the end effector to laterally deflect in a geometric plane of the substrate.

Preferably, the ferromagnetic core support structure comprises a base portion connected to the end effector; and a plurality of finger-like projections extending from the base portion. Additionally, the movable ferromagnetic inductor core is preferably on top of the plurality of finger-like projections of the ferromagnetic core support structure. Moreover, the device may further comprise multiple actuation beams; and multiple connection beams adapted to connect the multiple actuation beams to one another, wherein each of the multiple actuation beams comprise two pairs of the second electrodes. Preferably, the primary electrode is an extensional electrode and the secondary electrode is a contraction electrode. Moreover, the spring member may comprise a residual stress deformation mitigation spring adapted to prevent out-of-plane stress deformation of the actuator. Furthermore, one of the pairs of second electrodes may be actuated asymmetrically with respect to a first plane resulting in a piezoelectrically induced bending moment arm in a lateral direction that lies in a second plane. Additionally, the spring member may comprise a residual stress deformation mitigation spring adapted to restrict translational motion of the end effector to be within the second plane, wherein the first plane is transverse to the second plane.

These and other aspects of the embodiments herein will be better appreciated and understood when considered in conjunction with the following description and the accompanying drawings. It should be understood, however that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1A:
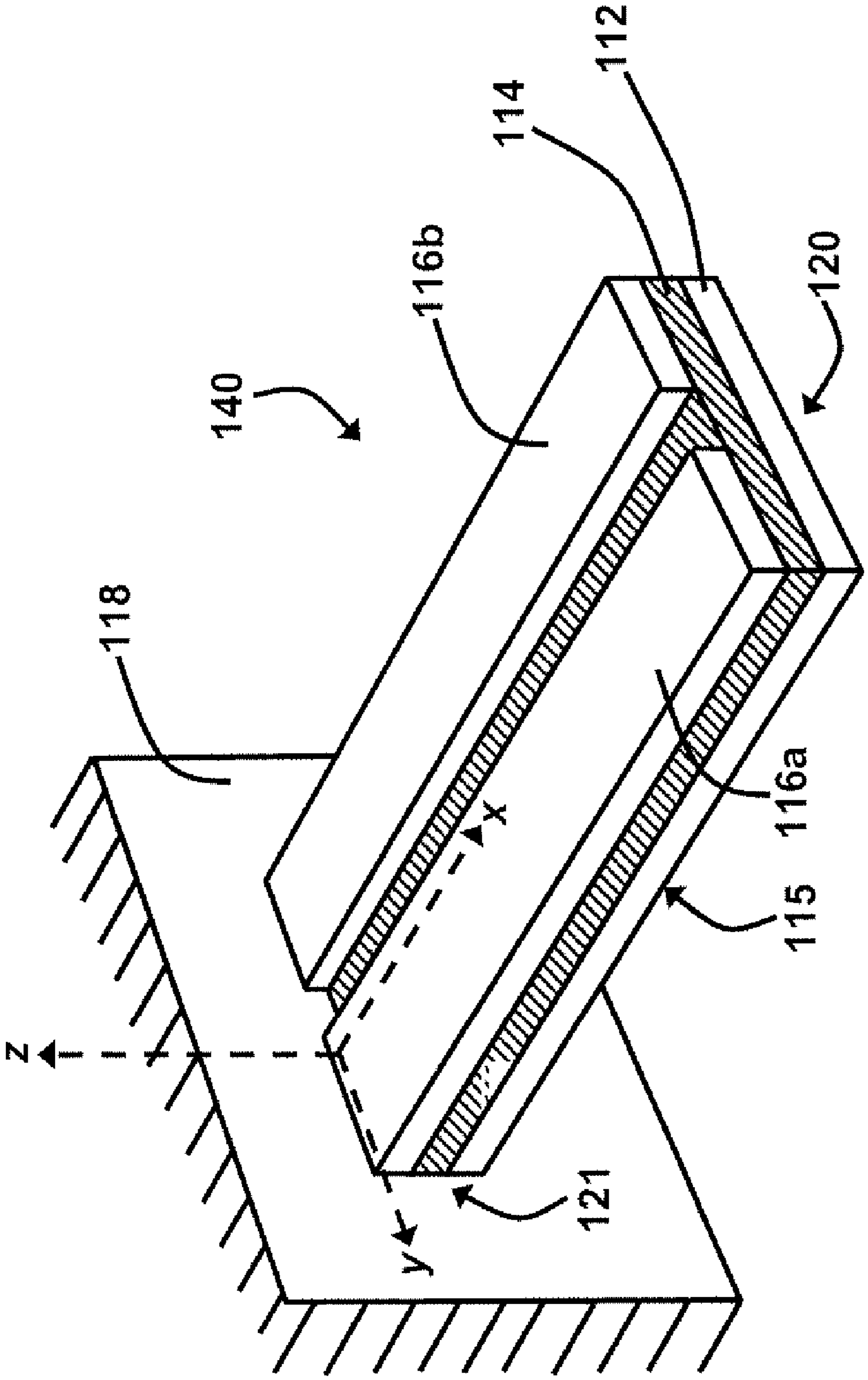
FIG. 1(A) is a perspective view of a cantilevered structure of a piezoelectric MEMS actuator device according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a novel piezoelectric MEMS inductor device which is capable of being tunable, and which can be incorporated in different types of electrical circuits. The embodiments herein achieve this by providing a lateral piezoelectric driven highly tunable MEMS inductor that enables as much as an order of magnitude increase in the tunability of high Q MEMS inductors and thus provides massive tunability and high Q in advanced RF circuits with applications in numerous military communications and radar systems. Referring now to the drawings, and more particularly to FIGS. 1(A) through 3, where similar reference characters denote corresponding features consistently throughout the figures, there are shown preferred embodiments.

There are multiple geometric configurations possible for the piezoelectric actuator/sensor used in accordance with the embodiments herein. One such configuration is illustrated as a cantilever beam 115 shown in FIGS. 1(A) through 1(C). FIG. 1(A) illustrates a piezoelectric actuator/sensor device 140 that comprises a pair of upper electrodes 116*a*, 116*b*, which may comprise platinum or other suitable material, disposed over an active piezoelectric layer 114, which is positioned above a lower electrode 112. The piezoelectric layer 114 preferably comprises sol-gel $PZ_{0.52}T_{0.48}$ (PZT). The configuration of the actuator/sensor device 140 enables proper device operation by having the upper electrodes 116*a*, 116*b* and the lower electrode 112 sandwich the piezoelectric layer 114. The absence of the traditional MEMS piezoelectric out-of-plane piezoelectric actuator's structural layer (found in conventional devices) ensures the optimal condition of the piezoelectric moment arm (δ) (shown in FIG. 1(B)) residing in the x-y plane according to the embodiments herein. The actuator/sensor device 140 comprises a free end 120 and an anchored end 121 attached to a substrate 118.

Figure 1C:
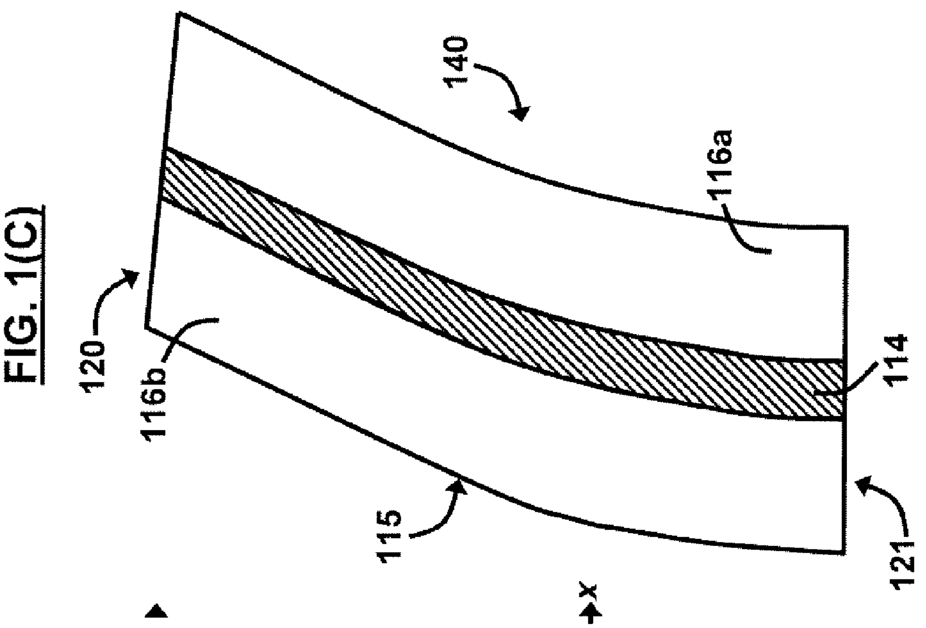
FIG. 1(C) is a top view of the cantilevered structure of FIG. 1(A) undergoing in-plane extensional deflection according to an embodiment herein.
Figure 1B:
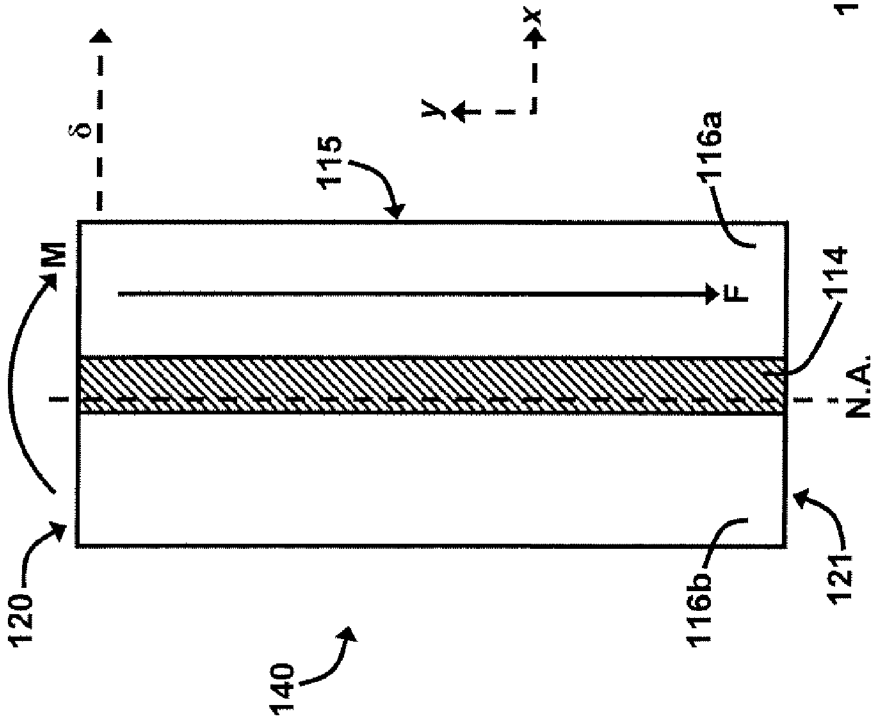
FIG. 1(B) is a top view of the cantilevered structure of FIG. 1(A) according to an embodiment herein.

FIG. 1(B) illustrates a top view of the actuator/sensor device 140 of FIG. 1(A). When a voltage is applied between the lower electrode 112 and one of the upper electrodes (shown here, for example, upper electrode 116*a*), a piezoelectrically generated strain induced axial force (F) offset from the neutral axis (N.A.) of the actuator/sensor device 140, creates a bending moment (M) on the actuator/sensor device 140, which is configured as a cantilever beam 115. This bending moment (M) causes in-plane deflection (x-y plane) of the actuator/sensor device 140 with the direction of the generated displacement shown as offset distance δ. FIG. 1(C) illustrates the actuator/sensor device 140 undergoing bending thereby producing lateral in-plane (x-y plane) deflection of the actuator/sensor device 140.

The configurations of the upper electrodes 116*a*, 116*b* are dependant upon actuator geometry. Unlike bulk piezoelectric actuators which may achieve bipolar actuation (piezoelectric strain may be compressive or tensile) through the application of the opposite polarity electric field, thin film piezoelectric actuators cannot achieve this for typical operating voltages. Typical thin film piezoelectrics (microns to sub-micron) operate above their coercive field experience only in-plane (x-y plane) contraction due to the high electric field nonlinearities associated with ferroelectric materials such as PZT. Therefore, large actuation in piezoelectric MEMS actuators only accommodates in-plane (x-y plane) compression and is largely independent of the polarity of the excitation electric field. Controlling the voltage-displacement response of the structure is therefore almost entirely 20 dependant upon the geometry and absolute value of the voltage. In the cantilever beam 115 illustrated in FIGS 1(A) through 1(C) only one upper electrode 116*a* (for example) is actuated; otherwise if both upper electrodes 116*a*, 116*b* were actuated, the generated bending moments (M) would cancel and no lateral bending would occur.

Figure 2A:
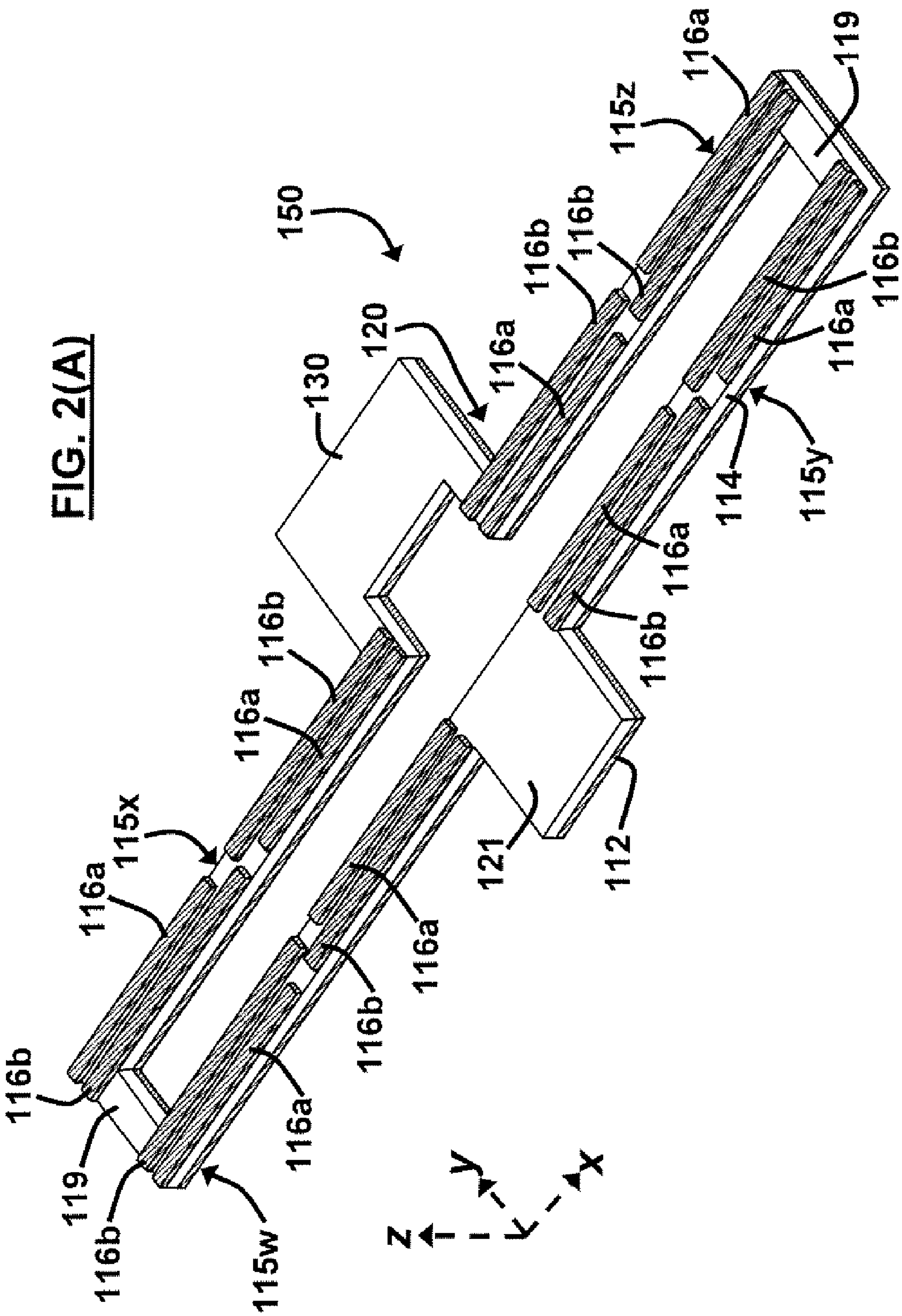
FIGS. 2(A) and 2(B) are top perspective views of a piezoelectric MEMS actuator device according to an embodiment herein.
Figure 2B:
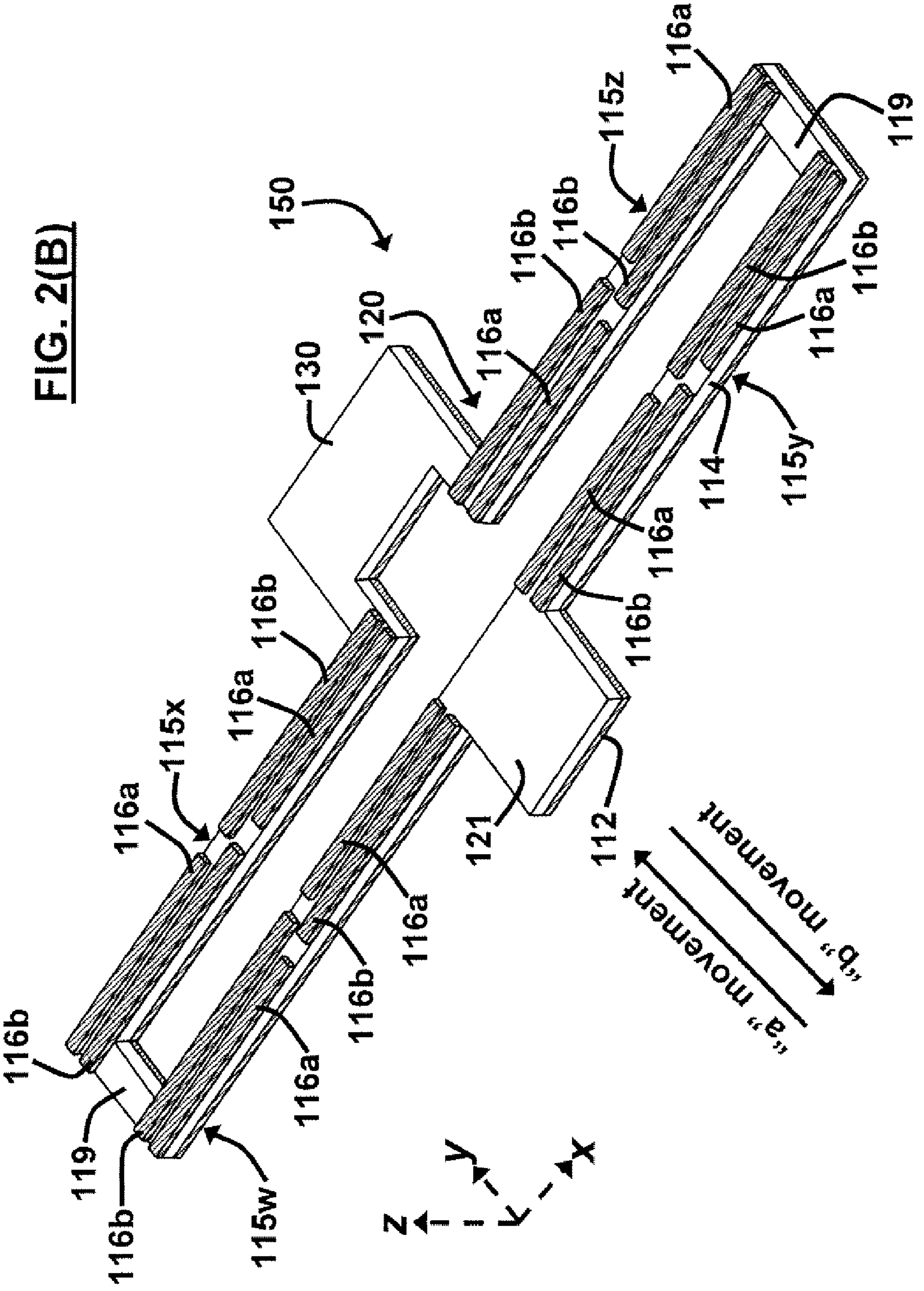

FIGS. 2(A) through 2(B) illustrate another piezoelectric MEMS actuator/sensor device 150 used in accordance with the embodiments herein (the overall concept and principal of actuation is similar to the actuator 140 of FIGS. 1(A) through 1(C)). An anchored end 121 of the actuator/sensor device 150 is attached to the substrate 118 (of FIG. 1(A)) which fixes the actuator/sensor device 150 in place and an end effector 130 is positioned opposite the anchored end 121 . The end effector 130 is positioned on the free end 120 of the piezoelectric MEMS actuator/sensor device 150. The displacement of the free end 120 largely remains in the x-y plane (plane of the substrate 118) upon actuation (i.e., application of voltage). FIG. 2(B) illustrates the general bidirectional actuation movement of the upper electrodes 116*a*, 116*b* where the "a" movement corresponds with the direction of movement of upper electrode 116*a* and the "b" movement corresponds with the direction of movement of upper electrode 116*b*. Generally, the actuation of upper electrode 116*a* results in contraction of the actuator/sensor device 150 and actuation of upper electrode 116*b* results in extension of the actuator/sensor device 150.

The actuation occurs similarly to the process described for the actuator/sensor device 140 of FIGS. 1(A) through 1(C), thus a voltage applied between the lower electrode 112 and one of the upper electrodes (shown here, for example, upper electrode 116*a* causes in-plane (x-y plane) deflection of the actuator/sensor device 150 with the direction of the generated displacement shown as "a" and "b" for the respective upper electrodes 116*a*, 116*b*. Likewise, the converse effect is true for the structure to function as a sensor. An applied stress, causing bending, will cause the piezoelectric material to generate a voltage which may be detected with additional electronics (not shown).

Generally, the actuator/sensor device 150 further comprises multiple sets of preferably four parallel actuation beams 115*w*, 115*x*, 115*y*, 115*z* connected at their extreme ends by perpendicular connection beams 119. Electrode traces (not shown) also run along the connection beams 119 to electrically connect all actuation beams 115*w*, 115*x*, 115*y*, 115*z* (shown in FIGS. 2(A) and 2(B)). Each set of four parallel actuation beams 115*w*, 115*x*, 115*y*, 115*z* may then be attached to the next set by additional connection beams 119 at the inner ends of the parallel actuation beams 115*w*, 115*x*, 115*y*, 115*z*. For the optimal configuration, the upper electrodes 116*a*, 116*b* on each parallel actuation beam 115*w*, 115*x*, 115*y*, 115*z* are separated in order to achieve maximum lateral deflection. The end effector 130 is located at the connection point of the last set of parallel actuation beams 115*x*, 115*z*. The end effector 130 remains in the x-y plane during actuation.

Figure 3:
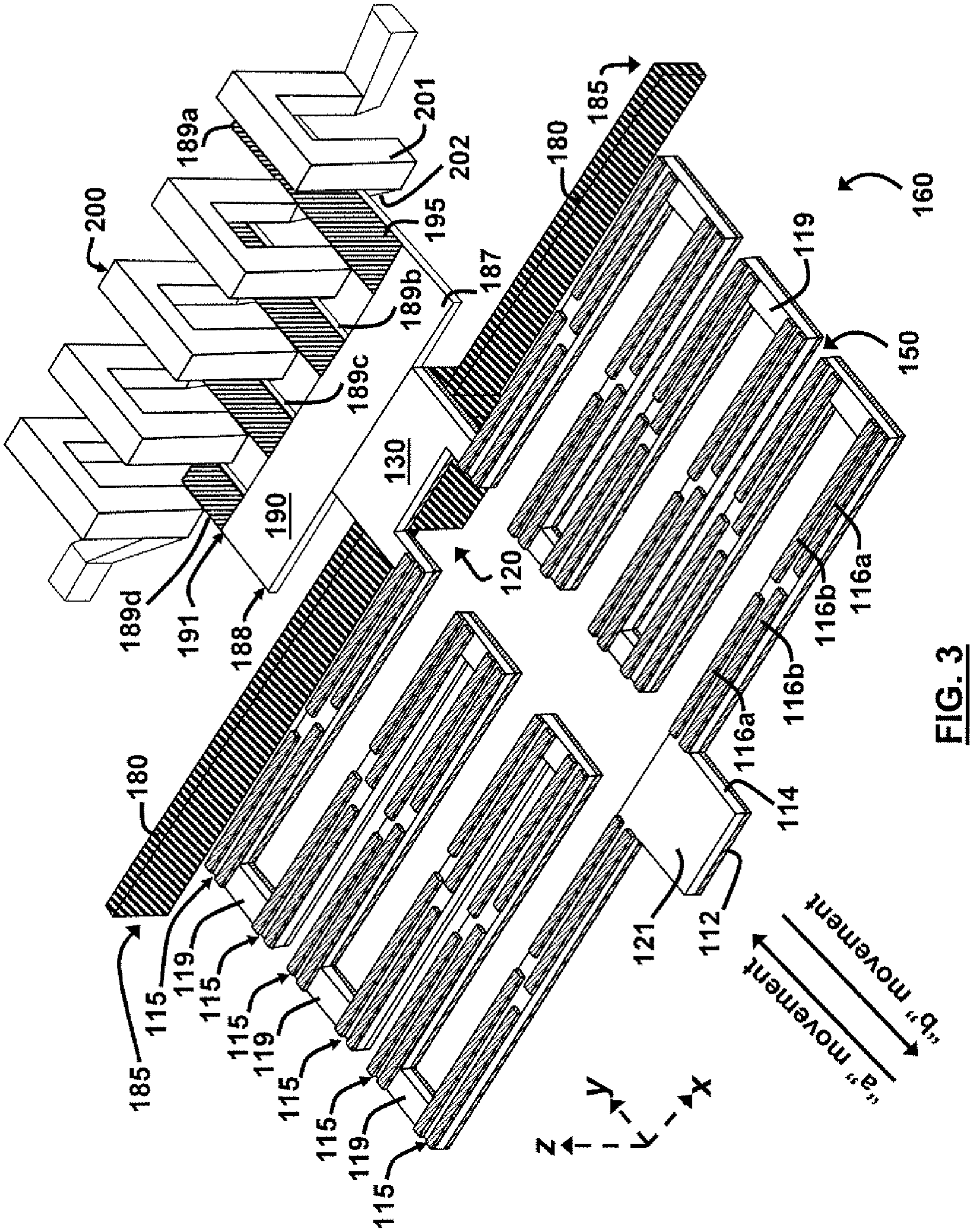
FIG. 3 is a top perspective view of a piezoelectric MEMS inductor device according to an embodiment herein.

FIG. 3 illustrates another embodiment of a piezoelectric MEMS actuator/sensor device 160 used in accordance with the embodiments herein (the overall concept and principal of actuation is similar to the actuator 140 of FIGS. 1(A) through 1(C) and the actuator 150 of FIGS. 2(A) and 2(B)). As shown, n additional sets of actuation beams 115 provide n times the deflection. The actuator/sensor device 160 comprises a spring member preferably embodied as residual stress deformation mitigation springs 180, which are configured to have a large out-of-plane stiffness (k), to resist residual stress deformation, and a large in-plane compliance that minimizes the influence of the springs 180 on the in-plane displacement of the actuator/sensor device 160. The springs 180, which may comprise single crystal silicon or other suitable material of minimal residual stress, are connected to the end effector 130 and are anchored (anchoring substrate not shown) at the ends 185 of the spring 180. Furthermore, there exist multiple possible geometric configurations for the springs 180. The various geometries are valid if they achieve large out-of-plane stiffness and large in-plane compliance such that they prevent out-of-plane stress deformation with minimal reduction of the in-plane displacement of the end effector 130.

A ferromagnetic core 188 is connected to the end effector 130 and changes the magnetic flux density and thus the inductance of the device 160. The preferable ferromagnetic material of the core 188 is characterized by low electrical conductivity and a high magnetic relative permeability. The material may be either laminated with a dielectric and/or is patterned to form numerous discrete sections so as to limit losses attributed to eddy currents generated within the ferromagnetic material.

The MEMS inductor 200 is the component of the device 160 that is to be electrically manipulated. The purpose of the device 160 is to alter the inductance of the MEMS inductor 200. Preferably, the inductor 200 is a solenoid inductor having a primary axis parallel to the end effector 130. The ferromagnetic core 188 comprises a base portion 187 and an interdigitated set of beams 189*a*-189*d* comprised of the active ferromagnetic material 195 atop a structural silicon layer 190. Generally, the base portion 187 and the set of beams 189*a*-189*d* form a ferromagnetic core support structure 191. Those skilled in the art would understand that multitudes of relative geometries are possible, and the embodiments herein are not necessarily limited to the example illustrated in FIG. 3 where beam 189*d* is the length of the previous beam 189*c* minus the width of the inductor 200, and beam 189*c* is the length of the previous beam 189*b* minus the width of the inductor 200, and beam 189*b* is the length of the previous beam 189*a* minus the width of the inductor 200. This particular case allows for a linear relationship between actuator displacement and the increase of the ferromagnetic mass with the core 188.

The inductor 200 is to be connected to either a DC circuit (not shown) or transmission line (not shown) for operation at high frequencies. It may be DC or in a coplanar waveguide "CPW" configuration. In the CPW configuration, the inductor 200 would additionally have flanking ground planes attached thereon. The overall design is also amenable to implementation in a "micro strip" transmission line.

The device 160 may be fabricated as follows (the thicknesses described below are approximate and are examples of preferred embodiments; however the embodiments herein are not limited to these thicknesses). The starting material of the substrate 118 is a single crystal silicon wafer. Next, $SiO_2$ (~1,000') is deposited via Plasma Enhanced Chemical Vapor Deposition (PECVD). Then, via DC magnetron sputtering, the lower electrode 112 (~200-800') comprising Ta/Pt is deposited. Thereafter, sol-gel is spin coated or Lead-Zirconate-Titanate (PZT) 114 (~5,000')is sputter deposited. After this, a liftoff process occurs with sputtered Pt to define the top electrode 116*a*, 116*b* (~800'). Upon completion of this step, the PZT layer 114 and TaPt (lower electrode 112) is ion milled down to the $SiO_2$ to define the actuator structure 140. Reactive Ion Etching (RIE) of the $SiO_2$ occurs next down to silicon substrate 118 to define the actuator 140. Next, a wet etching of the PZT 114 on bottom electrode bond pads (not shown) occurs. Thereafter, a PECVD process of the $SiO_2$ (~10,000') occurs. Then, the $SiO_2$ undergoes a RIE process to define a support cantilever structure for the inductor 200.

The next step of the process is an anisotropic Si etch to define residual stress mitigation springs 180, ferromagnetic core support structure 191, and the rest of the actuator 160. A liftoff process then occurs with evaporated Au to define lower segments of the inductor 200 on the predefined $SiO_2$ support cantilevers 189*a*-189*d*. After this, a liftoff process is used to define the active ferromagnetic material 195. Thereafter, a sacrificial layer (not shown) of sputtered silicon is deposited and patterned to open vertical posts 201 for the inductor 200. A liftoff process then occurs with evaporated Au to define the vertical posts 201 and connection beams 202, which connect adjacent turns of inductor 200. Next, a $XeF_2$ isotropic release process of the deposited sacrificial layer occurs of the remaining silicon beneath the actuator 160, residual stress mitigation springs 180, the ferromagnetic core support structure 191, and the silicon between the inductor turns so as to allow the core 188 to traverse the intended path.

Generally, the actuation of the device 160 occurs when the lateral piezoelectric MEMS actuator 160 actuates and interdigitates a multiple beam structure 191 with ferromagnetic material 195 atop into the core of a high Q RF MEMS inductor 200. The internal magnetic flux density of the inductor 200 is enhanced by the large magnetic permeability of the ferromagnetic material 195, thus altering the value of the inductance.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A microelectromechanical system (MEMS) device comprising:

a substrate;

an anchored end connected to said substrate;

an actuator comprising:

a first electrode;

a piezoelectric layer over said first electrode; and multiple sets of second electrodes over said piezoelectric layer, wherein each of said sets of second electrodes being defined by a transverse gap there between, and wherein one of said sets of second electrodes are actuated asymmetrically with respect to a first plane resulting in a piezoelectrically induced bending moment arm in a lateral direction that lies in a second plane;

an end effector opposite to said anchored end and connected to said actuator;

a ferromagnetic core support structure connected to said end effector;

a movable ferromagnetic inductor core on top of said ferromagnetic core support structure; and a MEMS inductor coiled around said ferromagnetic core support structure and said movable ferromagnetic inductor core.

2. The device of claim 1, wherein said ferromagnetic core support structure comprises:

a base portion connected to said end effector; and a plurality of finger-like projections extending from said base portion.

3. The device of claim 2, wherein said movable ferromagnetic inductor core is on top of said plurality of finger-like projections of said ferromagnetic core support structure.

4. The device of claim 1, further comprising:

multiple actuation beams; and multiple connection beams adapted to connect said multiple actuation beams to one another.

5. The device of claim 4, wherein each of said multiple actuation beams comprise two sets of said second electrodes.

6. The device of claim 1, wherein said set of second electrodes comprise an extensional electrode and a contraction electrode.

7. The device of claim 1, further comprising a spring attached to said end effector, wherein said spring comprises a residual stress deformation mitigation spring adapted to prevent out-of-plane stress deformation of said actuator.

8. The device of claim 1, further comprising a spring attached to said end effector, wherein said spring comprises a residual stress deformation mitigation spring adapted to restrict translational motion of said end effector to be within said second planes and wherein said first plane is transverse to said second plane.

9. A microelectromechanical system (MEMS) device comprising:

at least one actuation beam comprising:

a continuous lower electrode;

a piezoelectric layer over said lower electrode; and at least one pair of upper electrodes over said piezoelectric layer;

an anchored end connected to said at least one actuation beam;

an end effector opposite to said anchored end and connected to said at least one actuation beam;

a spring connected to said end effector;

a ferromagnetic core support structure connected to said end effector;

a movable ferromagnetic inductor core on top of said ferromagnetic core support structure; and a MEMS inductor coiled around said ferromagnetic core support structure and said movable ferromagnetic inductor core.

10. The device of claim 9, wherein said ferromagnetic core support structure comprises:

a base portion connected to said end effector; and a plurality of finger-like projections extending from said base portion.

11. The device of claim 10, wherein said movable ferromagnetic inductor core is on top of said plurality of finger-like projections of said ferromagnetic core support structure.

12. The device of claim 9, further comprising connection beams adapted to connect multiple actuation beams to one another.

13. The device of claim 9, wherein said at least one actuation beam comprises multiple pairs of said upper electrodes.

14. The device of claim 9, wherein said pair of upper electrodes comprises a first electrode and a second electrode, and wherein said pair of upper electrodes comprising a gap between said first electrode and said second electrode.

15. The device of claim 9, wherein said pair of upper electrodes comprise an extensional electrode and a contraction electrode.

16. The device of claim 9, wherein said spring member comprises a residual stress deformation mitigation spring adapted to prevent out-of-plane stress deformation of said actuation beam.

17. The device of claim 13, wherein one of said multiple pairs of upper electrodes are actuated asymmetrically with respect to a first plane resulting in a piezoelectrically induced bending moment arm in a lateral direction that lies in a second plane.

18. The device of claim 17, wherein said spring member comprises a residual stress deformation mitigation spring adapted to restrict translational motion of said end effector to be within said second plane, and wherein said first plane is transverse to said second plane.

19. The device of claim 9, further comprising a silicon substrate attached to said anchored end.

20. A microelectromechanical system (MEMS) device having a first end and a second end, said device comprising:

a sensor comprising:

a piezoelectric layer; and multiple electrodes sandwiching said piezoelectric layer, said multiple electrodes comprising a continuous first electrode attached to a first side of said piezoelectric layer and at least one pair of second electrodes attached to a second side of said piezoelectric layer, wherein said pair of second electrodes comprises a primary electrode and a secondary electrode defined by a transverse gap there between;

a substrate anchored to said first end;

an end effector attached to said second end;

a spring member attached to said end effector;

an anchored end connected to said sensor;

an end effector opposite to said anchored end and connected to said sensor;

a ferromagnetic core support structure connected to said end effector;

a movable ferromagnetic inductor core on top of said ferromagnetic core support structure; and a MEMS inductor coiled around said ferromagnetic core support structure and said movable ferromagnetic inductor core, wherein said multiple electrodes are adapted to receive voltage, said voltage causing said end effector to laterally deflect in a geometric plane of said substrate.

* * * * *